(12) United States Patent
Hoshi et al.

(10) Patent No.: US 12,519,108 B2
(45) Date of Patent: Jan. 6, 2026

(54) NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: Showa Denko Materials Co., Ltd., Tokyo (JP)

(72) Inventors: Kento Hoshi, Tokyo (JP); Yuma Kamiyama, Tokyo (JP); Hidetoshi Homboh, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 518 days.

(21) Appl. No.: 18/009,165

(22) PCT Filed: Jun. 17, 2021

(86) PCT No.: PCT/JP2021/023112
§ 371 (c)(1),
(2) Date: Dec. 8, 2022

(87) PCT Pub. No.: WO2022/264384
PCT Pub. Date: Dec. 22, 2022

(65) Prior Publication Data
US 2024/0234727 A1    Jul. 11, 2024

(51) Int. Cl.
*H01M 4/587* (2010.01)
*H01M 4/02* (2006.01)
*H01M 10/0525* (2010.01)

(52) U.S. Cl.
CPC ...... *H01M 4/587* (2013.01); *H01M 2004/021* (2013.01); *H01M 2004/027* (2013.01); *H01M 10/0525* (2013.01)

(58) Field of Classification Search
None
See application file for complete search history.

(56) References Cited

U.S. PATENT DOCUMENTS

| 10,790,503 B2 | 9/2020 | Kim et al. |
| 2012/0064403 A1 | 3/2012 | Kameda et al. |
| 2013/0143127 A1 | 6/2013 | Nakamura et al. |
| 2019/0273248 A1 | 9/2019 | Yamada et al. |

FOREIGN PATENT DOCUMENTS

| JP | 2013-197082 A | 9/2013 |
| JP | 2013-254728 A | 12/2013 |
| WO | 2010/110443 A1 | 9/2010 |
| WO | 2012/015054 A1 | 2/2012 |
| WO | 2020/213628 A1 | 10/2020 |

OTHER PUBLICATIONS

Machine Translation of JP2013197082 (Year: 2013).*

* cited by examiner

*Primary Examiner* — Wyatt P McConnell
(74) *Attorney, Agent, or Firm* — FITCH, EVEN, TABIN & FLANNERY, LLP (57) ABSTRACT

A negative electrode material for a lithium ion secondary battery, comprising graphite particles and a low-crystalline carbon layer that covers at least a portion of a surface of the graphite particles, and satisfying at least one of the following A) having two or more peaks in a R-value histogram obtained by a mapping Raman measurement; B) having a variance of 2.0 or more of a maximum peak in a R-value histogram obtained by a mapping Raman measurement; or C) having two or more carbon phases with a different degree of crystallinity.

18 Claims, 1 Drawing Sheet

NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATIONS

This application is a U.S. national phase application filed under 35 U.S.C. § 371 of International Application No PCT/JP2021/023112, filed Jun. 17, 2021, designating the United States, which is incorporated herein by reference in its entirety.

TECHNICAL FIELD

The present invention relates to a negative electrode material for a lithium ion secondary battery, a negative electrode for a lithium ion secondary battery, and a lithium ion secondary battery.

BACKGROUND ART

Lithium ion secondary batteries are widely used for electronic devices such as laptop computers, mobile phones, smart phones and tablet computers, by virtue of the compact, lightweight and high-energy-density characteristics thereof. In view of environmental issues in recent times such as global warming caused by $CO_2$ emission, the use of electric vehicles (EV), which are powered only by a battery, hybrid electric vehicles (HEV), which are powered by a gasoline engine and a battery in combination, and the like is increasingly widespread. Further, lithium ion secondary batteries are increasingly used in many fields such as power storage.

As a negative electrode material for a lithium ion secondary battery, a carbon material is widely used. The carbon material used as a negative electrode material is generally divided into two groups: i.e., graphite and low-crystalline carbon having a lower degree of crystallinity than graphite (including amorphous carbon).

Since graphite has a structure in which hexagonal network planes of carbon atoms are layered in a regular arrangement, intercalation/disintercalation of lithium ions proceeds at edge portions of the hexagonal network planes, thereby causing charge and discharge of the batteries.

Since low-crystalline carbon has a structure with irregular layering of hexagonal network planes, or does not have hexagonal network planes, intercalation/disintercalation of lithium ions proceeds at an entire surface of the negative electrode material. Therefore, lithium ion secondary batteries using low-crystalline carbon as a negative electrode material tend to exhibit superior input characteristics, while having a lower energy density, than lithium ion secondary batteries using graphite as a negative electrode material. Further, low-crystalline carbon is less reactive to an electrolyte than graphite, which is advantageous in terms of storage characteristics (longevity) of batteries.

In order to harness the advantages of graphite and low-crystalline carbon, respectively, a negative electrode material in which a surface of graphite particles is covered with low-crystalline carbon has been proposed (see, for example, International Publication No. WO2012/015054).

SUMMARY OF THE INVENTION

Problem to be Solved by the Invention

Negative electrode materials using carbon materials generally embody a trade-off relationship between input characteristics and storage characteristics. For example, when the particle size of the negative electrode material is decreased, the contact area with an electrolyte is increased and the input characteristics thereby improved. At the same time, the decrease in particle size promotes a side reaction with an electrolyte, thereby lowering the storage characteristics.

The negative electrode material described in WO2012/015054 suppresses a decrease in storage characteristics by covering a surface of graphite particles with low-crystalline carbon. However, there is demand for development of negative electrode material in which the storage characteristics are maintained in a more effective manner.

In view of the foregoing, an embodiment of the present invention is to provide a negative electrode material for a lithium ion secondary battery in which storage characteristics are favorably maintained; and a negative electrode for a lithium ion secondary battery and a lithium ion secondary battery using the negative electrode material.

Means for Solving the Problem

The specific means for solving the problem as described above include the following embodiments.

<1> A negative electrode material for a lithium ion secondary battery, the negative electrode material comprising graphite particles and a low-crystalline carbon layer that covers at least a portion of a surface of the graphite particles, and the negative electrode material having two or more peaks in an R-value histogram obtained by a mapping Raman measurement.

<2> A negative electrode material for a lithium ion secondary battery, the negative electrode material comprising graphite particles and a low-crystalline carbon layer that covers at least a portion of a surface of the graphite particles, and the negative electrode material having a variance of 2.0 or more of a maximum peak in an R-value histogram obtained by a mapping Raman measurement.

<3> A negative electrode material for a lithium ion secondary battery, the negative electrode material comprising graphite particles and a low-crystalline carbon layer that covers at least a portion of a surface of the graphite particles, and the negative electrode material having two or more carbon phases with a different degree of crystallinity from each other.

<4> The negative electrode material for a lithium ion secondary battery according to any one of <1> to <3>, having an average degree of circularity of from 0.8 to 1.0.

<5> A negative electrode for a lithium ion secondary battery, the negative electrode comprising:
a current collector, and
a negative electrode composition layer comprising the negative electrode material for a lithium ion secondary battery according to any one of claim 1 to claim 4, which is disposed at a surface of the current collector.

<6> A lithium ion secondary battery, comprising the negative electrode for a lithium ion secondary battery according to claim 5.

Effect of the Invention

According to an embodiment of the present invention, a negative electrode material for a lithium ion secondary battery in which storage characteristics are favorably maintained; and a negative electrode for a lithium ion secondary battery and a lithium ion secondary battery using the negative electrode material are provided.

EMBODIMENTS FOR IMPLEMENTING THE INVENTION

Embodiments for carrying out the present invention will now be described in detail. However, the invention is in no way limited to the following embodiments.

In the following embodiments, constituent elements (including element steps and the like) of the embodiments are not essential, unless otherwise specified. Likewise, numerical values and ranges thereof are not intended to restrict the invention.

In the present disclosure, the definition of the term "step" includes not only an independent step which is distinguishable from another step, but also a step which is not clearly distinguishable from another step, as long as the purpose of the step is achieved.

In the present disclosure, any numerical range described using the expression "from * to" represents a range in which numerical values described before and after the "to" are included in the range as a minimum value and a maximum value, respectively.

In a numerical range described in stages, in the present disclosure, an upper limit value or a lower limit value described in one numerical range may be replaced with an upper limit value or a lower limit value in another numerical range described in stages. Further, in a numerical range described in the present disclosure, the upper limit value or the lower limit value in the numerical range may be replaced with a value shown in the Examples.

In the present disclosure, each component may include plural kinds of substances corresponding to the component. In a case in which plural kinds of substances corresponding to each component are present in a composition, the content ratio or content of each component refers to the total content ratio or content of the plural kinds of substances present in the composition, unless otherwise specified.

In the present disclosure, particles corresponding to each component may include plural kinds of particles. In a case in which plural kinds of particles corresponding to each component are present in a composition, the particle size of each component refers to the value of the particle size of a mixture of the plural kinds of particles present in the composition, unless otherwise specified.

In the present disclosure, the term "layer" or "film" includes a layer or film being disposed at either a part of a region or an entire region, when a region at which the layer or film exists is observed.

In the present disclosure, the term "solid content" of a positive/negative electrode composition refers to a component of a slurry of positive/negative electrode composition other than a volatile component such as an organic solvent.

<Negative Electrode Material for Lithium Ion Secondary Battery>

The negative electrode material for lithium ion secondary battery according to the present disclosure (hereinafter, also referred to as a "negative electrode material") comprises graphite particles and a low-crystalline carbon layer that covers at least a portion of a surface of the graphite particles, and satisfies at least one of the following Condition A, Condition B or Condition C.

Condition A: having two or more peaks in an R-value histogram obtained by a mapping Raman measurement.

Condition B: having a variance of 2.0 or more of a maximum peak in an R-value histogram obtained by a mapping Raman measurement.

Condition C: having two or more carbon phases with a different degree of crystallinity from each other.

As a result of studies conducted by the present inventors, it was found that a negative electrode material that satisfies at least one of Condition A, Condition B or Condition C maintains storage characteristics in a more favorable manner, as compared with a negative electrode material that does not satisfy any one of Condition A, Condition B or Condition C.

Although the reason for this is not entirely clear, it may be that a layer of low-crystalline carbon that satisfies at least one of Condition A, Condition B or Condition C has an excellent ability to cover the graphite particles.

(Graphite Particles)

In the present disclosure, the graphite particles refers to particles formed of a carbon material having an interlayer distance in carbon network planes ($d_{002}$), measured by wide angle X-ray diffraction, of less than 0.340 nm.

The interlayer distance in carbon network planes ($d_{002}$) of the carbon material can be calculated by a Bragg equation from a diffraction peak corresponding to the carbon 002 plane, which appears at a position at which a diffraction angle 2θ is approximately from 24° to 27° in a diffraction profile. The diffraction profile is obtained by exposing a specimen to X-rays (CuKα) and measuring a diffraction line with a goniometer.

Measurement of $d_{002}$ can be conducted under the following conditions.

Radiation source: CuKα (wavelength: 0.15418 nm)
Output power: 40 kV, 20 mA
Sampling width: 0.010°
Scanning range: 10° to 35°
Scanning rate: 0.5°/min $$2d \sin θ = nλ \qquad \text{Bragg equation:}$$

In the equation, d refers to a period length, n refers to an order of reflection, and λ refers to a wavelength of the X-ray.

It is possible to use graphite particles obtained by pulverizing a natural graphite cake. Since graphite particles obtained by pulverizing a natural graphite cake may include impurities, the graphite particles are preferably subjected to a refining treatment.

The method for a refining treatment is not particularly limited, and may be selected from known processes for refinement. Examples of the method include flotation, electrochemical treatments, and chemical treatments.

The degree of purity of natural graphite is preferably 99.8% by mass or more (ash content: 0.2% by mass or less), more preferably 99.9% by mass or more (ash content: 0.1% by mass or less). When the degree of purity of natural graphite is 99.8% by mass or more, safety of a battery is more improved and battery properties tend to further improve.

The degree of purity of natural graphite may be calculated from the amount of residues derived from ash, which remains after placing 100 g of graphite in a furnace heated at 800° C. in an atmosphere for at least 48 hours, for example.

It is possible to use graphite particles obtained by pulverizing artificial graphite, which is obtained by calcining a resin-based material such as epoxy resin or phenol resin, or a pitch-based material obtained from petroleum, coal or the like.

The method for obtaining artificial graphite is not particularly limited, and examples thereof include a method of calcining a raw material, such as a thermoplastic resin, naphthalene, anthracene, phenanthroline, coal tar or tar pitch, in an inert atmosphere at a temperature of 800° C. or more. The calcined product is pulverized with a known means such as a jet mill, a vibrating mill, a pin mill or a hammer mill for adjusting the average particle size to a range of approximately from 2 μm to 40 μm, thereby obtaining graphite particles originating from artificial graphite. It is possible to subject a raw material to a thermal treatment prior to calcination.

In a case in which a raw material is subjected to a thermal treatment, graphite particles originating from artificial graphite may be obtained by, for example, subjecting the raw material to a thermal treatment with an autoclave or the like, roughly pulverizing the raw material after the thermal treatment with a known means, prior to the processes of calcining the raw material in an inert atmosphere at a temperature of 800° ° C. and pulverizing the calcined product for adjusting the average particle size to a range of approximately from 2 μm to 40 μm, as mentioned above.

(Low-Crystalline Carbon Layer)

In the present disclosure, the low-crystalline carbon refers to a carbon material having an interlayer distance in carbon network planes ($d_{002}$) measured by wide angle X-ray diffraction of 0.340 nm or more. In the present disclosure, amorphous carbon is regarded as low-crystalline carbon.

A carbon material having an interlayer distance in carbon network planes ($d_{002}$) of from 0.340 nm to less than 0.350 nm may be referred to as soft carbon (easily graphitizable carbon), and a carbon material having an interlayer distance in carbon network planes ($d_{002}$) of 0.350 nm or more may be referred to as hard carbon (non-graphitizable carbon), respectively.

The thickness of the low-crystalline carbon layer (maximum value when the thickness is not uniform) is not particularly limited, and may be selected from 0.5 nm to 500 nm, for example.

The thickness of the low-crystalline carbon layer may be measured with a transmission electron microscope (TEM), for example.

The mass ratio of the low-crystalline carbon layer with respect to 1 part by mass of graphite particles is preferably from 0.005 to 10, more preferably from 0.005 to 5, further preferably from 0.005 to 0.08. When the mass ratio is 0.005 or more, a battery tends to exhibit excellent initial charge/discharge efficiency and lifetime characteristics. When the mass ratio is 10 or less, a battery tends to exhibit excellent output properties.

The mass ratio may be calculated from a rate of decrease in weight at a temperature range of from 500° ° C. to 600° C. by measuring a change in weight in an air stream by TG-DTA (Thermogravimetry-Differential Thermal Analysis). The change in weight at a temperature range of 500° ° C. to 600° C. may be attributed to a change in weight of a material other than graphite, and therefore the remainder after the thermal treatment may be attributed to the amount of graphite.

Examples of the method for covering a surface of graphite particles with a low-crystalline carbon layer include performing a thermal treatment to a mixture including graphite particles and a precursor of low-crystalline carbon layer.

Examples of the precursor of low-crystalline carbon layer include pitches and organic polymer compounds.

Examples of the pitches include ethylene-heavy-end pitch, crude-oil pitch, coal-tar pitch, asphalt-decomposed pitch, pitches obtained by thermal decomposition of polyvinyl chloride or the like, and pitches obtained by polymerization of naphthalene or the like under the presence of a super-strong acid.

Examples of the organic polymer compounds include thermoplastic resins such as polyvinyl chloride, polyvinyl alcohol, polyvinyl acetate and polyvinyl butyral, and natural products such as starch and cellulose.

The negative electrode material that satisfies at least one of Condition A. Condition B or Condition C may be obtained by, for example, using two or more kinds of materials as a precursor for a low-crystalline carbon layer that covers a surface of graphite particles.

The low-crystalline carbon layer of the negative electrode material that satisfies at least one of Condition A. Condition B or Condition C is preferably formed by using two or more kinds of precursors that turn to a carbon phase at a different temperature from each other. In that case, a precursor that turns to a carbon phase at a lower temperature forms a carbon phase at a surface of graphite particles, followed by a precursor that turns to a carbon phase at a higher temperature, thereby forming a low-crystalline carbon layer having excellent covering properties.

In an embodiment, the low-crystalline carbon layer is preferably formed by using a precursor selected from pitches and a precursor selected from organic polymer compounds, respectively.

When the low-crystalline carbon layer includes two or more kinds of carbon phases having a different degree of crystallinity from each other, that content of a carbon phase that accounts for the greatest content ratio in the low-crystalline carbon layer is preferably from 10% by mass to 90% by mass, more preferably from 20% by mass to 80% by mass, further preferably from 30% by mass to 70% by mass, with respect to the total mass of low-crystalline carbon layer.

It is possible to determine whether or not a low-crystalline carbon layer includes two or more kinds of carbon phases having a different degree of crystallinity from each other from a histogram of an R value obtained by mapping Raman measurement. Specifically, when the histogram of an R value obtained by mapping Raman measurement has two or more peaks, or has a variance of 2.0 or more of a maximum peak, it may be determined that the low-crystalline carbon layer satisfies Condition A. The upper limit of the variance of a maximum peak may be 5.0, for example.

The mapping Raman measurement is performed using a microscopic Raman spectrometer (for example, DXR imaging microscopic Raman spectrometer by Thermo Fisher Scientific). The measurement is conducted with a laser beam of 532 nm, a 100-magnification lens and an aperture of 25 μmφ. The irradiation time and the cumulated number are determined such that a sufficient degree of SN ratio is achieved with an output power of 2.0 mW. For example, the irradiation time is determined as 2 minutes and the cumulated number is determined as 30 times. A histogram is obtained by measuring the R value at at least 100 points by changing the location of the points on the particle by 1.5 μm or more, or by changing the particles for the measurement.

Examples of the method for covering a surface of graphite particles with a low-crystalline carbon layer obtained from two or more kinds of precursors include: a first method including subjecting a mixture containing graphite particles and two or more kinds of precursors to a thermal treatment; and a second method including subjecting a mixture containing graphite particles and a precursor to a thermal treatment, adding a different kind of precursor to the mixture, and further subjecting the mixture to a thermal treatment. From the viewpoint of production efficiency, the first method is preferred.

(Particle Shape)

The shape of the negative electrode material is not particularly limited. The negative electrode material may have a spherical shape, a flat shape, an irregular shape or the like.

From the viewpoint of a balance between the input characteristics and the storage characteristics, the negative electrode material preferably has a spherical or nearly-spherical shape. The negative electrode material is preferably not in the form of secondary particles.

In an embodiment, the negative electrode material preferably has an average degree of circularity of from 0.8 to 1.0, more preferably from 0.9 to 1.0, further preferably from 0.95 to 1.0.

The average degree of circularity of the negative electrode material may be measured using a wet flow-type particle shape/size analyzer (for example, Sysmex FPIA-3000, Malvern).

Prior to the measurement, preprocessing is performed by stirring pure water containing negative electrode material (0.06 g) and a surfactant (0.2% by mass, Liponol T/15. Lion Specialty Chemicals) with a test tube mixer (Pasolina NS-80, AS ONE Corporation) for 20 seconds, optionally followed by ultrasonic stirring for 1 minute. As an ultrasonic cleaning machine, US 102, SND Corporation, high-frequency output: 100 W, oscillation frequency: 38 kHz) may be used.

The analysis based on the measurement results, such as a deviation of a degree of circularity, may be performed in view of FPIA-3000 science information (2nd edition, issued Aug. 31, 2006). The measurement is performed at a temperature of 25° C., a concentration of sample of 10% by mass, and a number of particles for counting of 10,000. Water is used for dispersing the particles.

(Average Particle Size)

The average particle size of the negative electrode material is preferably from 2 μm to 30 μm, more preferably from 2.5 μm to 25 μm, further preferably from 3 μm to 20 μm, yet further preferably from 5 μm to 20 μm. When the average particle size of the graphite particles is 30 μm or less, a battery tends to exhibit improved discharge capacity and discharge properties.

When the average particle size of the graphite particles is 2 μm or more, a battery tends to exhibit improved initial charge/discharge properties.

The average particle size of the negative electrode material refers to a volume average particle size measured with a particle size distribution analyzer (such as SALD-3000, Shimadzu Corporation) by a laser diffraction/scattering method. Specifically, the volume average particle size is obtained as a median size d50 from a volume-based particle size distribution.

In an embodiment, the average particle size of the negative electrode material may be 9 μm or less, or may be 8 μm or less. When the average particle size of the graphite particles is 9 μm or less, a battery tends to exhibit favorable input properties.

Since the negative electrode material of the present disclosure maintains favorable storage properties even when the average particle size is 9 μm or less, it is possible to improve the input properties and the storage properties at the same time.

(R Value)

The R value of the negative electrode material is preferably from 0.10 to 0.60, more preferably from 0.15 to 0.55, further preferably from 0.20 to 0.50.

The R value refers to a ratio ID/IG, wherein ID is a peak intensity measured at a range of from 1300 $cm^{-1}$ to 1400 $cm^{-1}$ and IG is a peak intensity measured at a range of from 1580 $cm^{-1}$ to 1620 $cm^{-1}$, in a Raman spectrum obtained by exposing the negative electrode material to a laser light of 532 nm.

The Raman spectrum may be measured with a Raman spectrometer (such as DXR, Thermo Fisher Scientific).

(BET Specific Surface Area)

The negative electrode material preferably has a BET specific surface area of from 0.8 $m^2/g$ to 8 $m^2/g$, more preferably from 1 $m^2/g$ to 7 $m^2/g$, further preferably from 1.5 $m^2/g$ to 6 $m^2/g$.

When the BET specific surface area of the negative electrode material is 0.8 $m^2/g$ or more, a battery tends to exhibit excellent performances. When the BET specific surface area of the negative electrode material is 8 $m^2/g$ or less, the negative electrode material tends to have a high degree of tap density, and tends to be mixed favorably with other materials such as a binder and a conductive agent.

The BET specific surface area of the negative electrode material may be measured from a nitrogen adsorption property according to JIS Z 8830:2013. The measurement device may be AUTOSORB-1, Quantachrome. Since a gas adsorption property of a sample material may be affected by moisture adsorbing to a surface or inside of the sample material, a pretreatment for removing moisture by heat is preferably performed prior to measuring the BET specific surface area.

In the pretreatment, a measurement cell containing 0.05 g of a sample material is decompressed to have an inner pressure of 10 Pa or less with a vacuum pump, and then heated at 110° ° C. for 3 hours or more. Subsequently, the measurement cell is naturally cooled down to an ordinary temperature (25° C.) while maintaining a decompressed state. After the pretreatment, the BET specific surface area of the sample material is measured at a temperature of 77K and a pressure range of less than 1 with respect to a relative pressure (a balance pressure to saturated vapor pressure).

<Negative Electrode for Lithium Ion Secondary Battery>

The negative electrode for a lithium ion secondary battery according to the present disclosure includes:
  a current collector, and
  a negative electrode composition layer comprising the negative electrode material for a lithium ion secondary battery according to the present disclosure, which is disposed at a surface of the current collector.

The details of the current collector and the negative electrode composition layer are described later.

<Lithium Ion Secondary Battery>

The lithium ion secondary battery according to the present disclosure includes a negative electrode that includes the negative electrode material for a lithium ion secondary battery according to the present disclosure, and the configuration thereof is not specifically limited. The negative electrode material may be included in a negative electrode composition layer.

(General Description of Lithium Ion Secondary Battery)

The lithium ion secondary battery has, in a battery container, a positive electrode, a negative electrode, a separator and a non-aqueous electrolyte. The separator is disposed between the positive electrode and the negative electrode.

When charging the lithium ion secondary battery, a charger is connected between the positive electrode and the negative electrode. During the charging, lithium ions that have been intercalated into a positive-electrode active material are desorbed and released into the non-aqueous electrolyte. The lithium ions that have been released into the non-aqueous electrolyte migrate toward the negative electrode through the separator. The lithium ions that have reached the negative electrode are intercalated into a negative-electrode active material.

When discharging the lithium ion secondary battery, an external load is connected between the positive electrode and the negative electrode. During the discharging, lithium ions that have been intercalated into a negative-electrode active material are desorbed and released into the non-aqueous electrolyte. At this time, electrons are released from the negative electrode. The lithium ions that have been released into the non-aqueous electrolyte migrate toward the positive electrode through the separator. The lithium ions that have reached the positive electrode are intercalated into a positive-electrode active material. Intercalation of lithium ions into a positive-electrode active material causes electrons to run into the positive electrode. The migration of electrons from the negative electrode to the positive electrode causes the lithium ion secondary battery to discharge.

As seen above, lithium ion secondary batteries are charged and discharged by way of intercalation and desorption of lithium ions between a positive-electrode active material and a negative-electrode active material. Specific examples of lithium ion secondary batteries are described later (in FIG. 1, for example).

In the following, components of lithium ion secondary batteries, including the positive electrode, negative electrode, separator and other optional components are explained.

(Positive Electrode)

The lithium ion secondary battery has a positive electrode that is applicable to high-capacity and high-power lithium ion secondary batteries.

The positive electrode (positive electrode plate) has a current collector (positive-electrode current collector) and a positive-electrode composition layer that is disposed onto a surface of the current collector. The positive-electrode composition layer refers to a layer being disposed at a surface of a current collector and including at least a positive-electrode active material.

The positive electrode preferably includes a lamellar lithium/nickel/manganese/cobalt composite oxide (also referred to as NMC) as a positive-electrode active material. A battery using NMC tends to have a high degree of capacity and safety.

In view of a further improvement in safety, the positive electrode preferably includes a combination of NMC and a spinel lithium/manganese composite oxide (hereinafter, also referred to as sp-Mn) as a positive-electrode active material.

From the viewpoint of increasing the battery capacity, the content of NMC is preferably 65% by mass or more, more preferably 70% by mass or more, further preferably 80% by mass or more, with respect to a total amount of the positive-electrode composition.

The NMC is preferably a composite oxide represented by the following formula.

$$Li_{(1+\delta)}Mn_xNi_yCo_{(1-x-y-z)}M_zO_2$$

In the formula, (1+δ), x, y and (1−x−y−z) refer to composite ratios of Li (lithium), Mn (manganese), Ni (nickel) and Co (cobalt), respectively, and z refers to a composite ratio of element M. The composite ratio of O (oxygen) is 2.

M refers to at least one element selected from the group consisting of Ti (titanium), Zr (zirconium), Nb (niobium), Mo (molybdenum), W (tungsten), Al (aluminum), Si (silicon), Ga (gallium), Ge (germanium) and Sn (tin).

The formula satisfies the following conditions: −0.15<δ<0.15, 0.1<x≤0.5, 0.6<x+y+z<1.0 and 0≤z≤0.1.

The sp-Mn is preferably a composite oxide represented by the following formula.

$$Li_{(1+\eta)}Mn_{(2-\lambda)}M'_\lambda O_4$$

In the formula, (1+η), (2−λ) and λ refer to composite ratios of Li (lithium), Mn (manganese) and element M', respectively. The composite ratio of O (oxygen) is 4.

M' refers to at least one element selected from the group consisting of Ca (calcium), Sr (strontium), Al, Ga, Zn (zinc) and Cu (copper).

The formula satisfies the following conditions: 0≤η≤0.2 and 0≤λ≤0.1.

M' is preferably Mg or Al. When M' is Mg or Al, a battery tends to achieve improved lifetime characteristics and safety. Further, addition of element M' reduces the amount of elution of Mn, thereby improving storage and charge/discharge properties of a battery.

Materials other than NMC and sp-Mn may be used as a positive-electrode active material.

Examples of a positive-electrode active material other than NMC and sp-Mn include lithium-containing composite metal oxides other than NMC and sp-Mn; olivine lithium salts; chalcogen compounds; and manganese dioxide.

The lithium-containing composite metal oxide is a metal oxide including lithium and a transition metal, or a metal oxide including lithium, a transition metal, and a different element that substitutes a part of the transition metal.

Examples of the different element Na, Mg, Sc, Y, Mn, Fe, Co, Ni, Cu, Zn, Al, Cr, Pb, Sb, V and B, preferably Mn, Al, Co, Ni and Mg.

The lithium-containing composite metal oxide may include a single kind of different element, or may include two or more kinds in combination.

Examples of the lithium-containing composite metal oxide other than NMC and sp-Mn include $Li_xCoO_2$, $Li_xNiO_2$, $Li_xMnO_2$, $Li_xCo_yNi_{1-y}O_2$, $Li_xCo_yM^1_{1-y}O_z$ (in $Li_xCo_yM^1_{1-y}O_z$, $M^1$ is at least one element selected from Na, Mg, Sc, Y, Mn, Fe, Ni, Cu, Zn, Al, Cr, Pb, Sb, V and B), $Li_xNi_{1-y}M^2_yO_z$ (in $Li_xNi_{1-y}M^2_yO_z$, $M^2$ is at least one element selected from Na, Mg, Sc, Y, Mn, Fe, Co, Cu, Zn, Al, Cr, Pb, Sb, V and B), wherein 0<x≤1.2, y is from 0 to 0.9, z is from 2.0 to 2.3. In the chemical formulas, x refers to a molar ratio of lithium, which is variable by a state of charging or discharging.

Examples of the olivine lithium salt include $LiFePO_4$.

Examples of the chalcogen compound include titanium disulfide and molybdenum disulfide.

The positive electrode may include a single kind of positive-electrode active material, or may include two or more kinds in combination.

In the following, details of the positive-electrode composition layer and the current collector are explained.

The positive-electrode composition layer includes a positive-electrode active material and a binder or the like, and is disposed on a current collector. The method for forming the positive-electrode composition layer is not particularly limited. For example, the positive-electrode composition layer may be formed by forming a sheet of a composition including a positive-electrode active material, a binder, and optional components such as a conductive agent, a thickener and the like by a dry process, and attaching the sheet to a current collector (dry method). Alternatively, the positive-electrode composition layer may be formed by preparing a slurry of a positive-electrode composition by dissolving or dispersing a positive-electrode active material, a binder, and optional components such as a conductive agent, with a solvent, and applying the slurry to a current collector and drying (wet method).

As the positive-electrode active material, a lamellar lithium/nickel/manganese/cobalt composite oxide (NMC) is preferably used. The positive-electrode active material is used in a powdery (particulate) form and mixed with other materials.

The particles of positive-electrode active material such as NMC or sp-Mn may have a lampy shape, polyhedral shape, spherical shape, oval shape, plate-like shape, needle-like shape or rod-like shape.

The average particle size (d50) of the particles of positive-electrode active material such as NMC or sp-Mn (when the particles is in the form of secondary particles formed of primary particles, the average particle size (d50) of the secondary particles is regarded as the average particle size of the positive-electrode active material) is preferably from 1 µm to 30 µm, more preferably from 3 µm to 25 µm, further preferably from 5 µm to 15 µm, from the viewpoint of tap density (fillability) and mixability with other materials in the formation of an electrode. The average particle size (d50) of the particles of positive-electrode active material may be measured in the same manner as the graphite particles.

The BET specific surface area of the particles of positive-electrode active material such as NMC or sp-Mn is preferably from 0.2 $m^2/g$ to 4.0 $m^2/g$, more preferably from 0.3 $m^2/g$ to 2.5 $m^2/g$, further preferably from 0.4 $m^2/g$ to 1.5 $m^2/g$.

When the BET specific surface area of the particles of positive-electrode active material is 0.2 $m^2/g$ or more, a battery tends to achieve excellent battery performances. When the BET specific surface area of the particles of positive-electrode active material is 4.0 $m^2/g$ or less, the particles of positive-electrode active material tends to have a high tap density and is mixed favorably with other materials such as a binder or a conductive agent. The BET specific surface area of the particles of positive-electrode active material may be measured in the same manner as the graphite particles.

Examples of the conductive agent include metal materials such as copper and nickel and carbon materials. The carbon materials include graphite such as natural graphite and artificial graphite, carbon black such as acetylene black, and amorphous carbon such as needle coke. A single kind of the conductive agent may be used, or two or more kinds thereof may be used in combination.

The content of the conductive agent with respect to the mass of the positive-electrode composition layer is preferably from 0.01% by mass to 50% by mass, more preferably from 0.1% by mass to 30% by mass, further preferably from 1 to 15% by mass. When the content of the conductive agent is 0.01% by mass or more, a positive-electrode composition layer tends to achieve a sufficient degree of conductivity. When the content of the conductive agent is 50% by mass or less, a decrease in battery capacity tends to be suppressed.

The binder for the positive electrode is not particularly limited, and may be selected from materials having favorable dissolvability or dispersibility with respect to a solvent in a case of forming a positive-electrode composition layer by a wet method.

Specific examples of the binder include resin-type polymers such as polyethylene, polypropylene, polyethylene terephthalate, polyimide and cellulose; rubber-type polymers such as SBR (styrene-butadiene rubber) and NBR (acrylonitrile-butadiene rubber); fluorine-type polymers such as polyvinylidene fluoride (PVdF), polytetrafluoroethylene, polytetrafluoroethylene/vinylidene fluoride copolymer, and fluorinated polyvinylidene fluoride; and polymer compositions being conductive to alkali metal ions (especially lithium ions). A single kind of the binder for positive electrode may be used, or two or more kinds thereof may be used in combination.

From the viewpoint of stability of a positive electrode, fluorine-type polymers such as polyvinylidene fluoride (PVdF) and polytetrafluoroethylene are preferred as the binder.

The content of the binder with respect to the mass of the positive-electrode composition layer is preferably from 0.1% by mass to 60% by mass, more preferably from 1% by mass to 40% by mass, further preferably from 3% by mass to 10% by mass.

When the content of the binder is 0.1% by mass or more, it is possible to sufficiently bind the positive-electrode active material, thereby achieving a sufficient degree of mechanical strength of the positive-electrode composition layer and improving the battery performance such as cycle characteristics. When the content of the binder is 60% by mass or less, a sufficient degree of battery capacity and conductivity tend to be achieved.

The thickening agent is effective for adjusting the viscosity of a slurry. The thickening agent is not specifically limited, and specific examples thereof include carboxymethyl cellulose, methyl cellulose, hydroxymethyl cellulose, ethyl cellulose, polyvinyl alcohol, oxidized starch, phosphorylated starch, casein and a salt of these materials. A single kind of the thickening agent may be used, or two or more kinds thereof may be used in combination.

The content of the thickening agent with respect to the mass of positive-electrode composition layer is preferably from 0.1% by mass to 20% by mass, more preferably from 0.5% by mass to 15% by mass, further preferably from 1% by mass to 10% by mass, from the viewpoint of input/output properties and battery capacity.

The solvent used for preparing a slurry is not particularly limited, as long as it can dissolve or disperse a positive-electrode active material, a binder, and optional components such as a conductive agent or a thickening agent. The solvent may be either an aqueous solvent or an organic solvent. Examples of the aqueous solvent include water, alcohol and a mixed solvent of water and alcohol. Examples of the organic solvent include N-methyl-2-pyrrolidone (NMP), dimethyl formamide, dimethyl acetamide, methyl ethyl ketone, cyclohexanone, methyl acetate, methyl acrylate, tetrahydrofuran (THF), toluene, acetone, diethyl ether, dimethyl sulfoxide, benzene, xylene and hexane.

The thickening agent is preferably used especially in a case of using an aqueous solvent.

The positive-electrode composition layer formed on a current collector by a wet method or a dry method is preferably subjected to compression by hand pressing, roller pressing, or the like.

The density of the positive-electrode composition layer after the compression is preferably from 2.5 g/cm$^3$ to 3.5 g/cm$^3$, more preferably from 2.55 g/cm$^3$ to 3.15 g/cm$^3$, further preferably from 2.6 g/cm$^3$ to 3.0 g/cm$^3$, from the viewpoint of further improvements in input/output properties and safety.

The amount of the positive-electrode composition to apply to a current collector as a solid content is preferably from 30 g/m$^2$ to 170 g/m$^2$, more preferably from 40 g/m$^2$ to 160 g/m$^2$, further preferably from 40 g/m$^2$ to 150 g/m$^2$, for one side of the current collector.

In view of the amount of the positive-electrode composition to apply to a current collector and the density of the positive-electrode composition layer, the average thickness of the positive-electrode composition layer is preferably from 19 μm to 68 μm, more preferably from 23 μm to 64 μm, further preferably from 36 μm to 60 μm. In the present disclosure, an average value of measured values at randomly-selected 10 points is regarded as an average thickness of the positive-electrode composition layer.

The material for the current collector for positive electrode is not particularly limited. The material is preferably a metal material, more preferably aluminum.

The shape of the current collector is not particularly limited, and materials being processed into a shape of various types may be used. Examples of the metal materials include metal foils, metal plates, metal films and expanded metal meshes. Among these, metal foils are preferably used. It is possible to use a mesh-type metal film.

The average thickness of the current collector for positive electrode is not particularly limited. From the viewpoint of imparting a sufficient degree of strength and a sufficient degree of flexibility to a current collector, the average thickness is preferably from 1 μm to 1 mm, more preferably from 3 μm to 100 μm, further preferably from 5 μm to 100 μm.

(Negative Electrode)

The lithium ion secondary battery of the present disclosure has a negative electrode that is applicable to high-capacity and high-power lithium ion secondary batteries.

The negative electrode (negative-electrode plate) has a current collector (negative-electrode current collector) and a negative-electrode composition layer being disposed on the current collector. The negative-electrode composition layer is a layer being disposed on a current collector and including a negative-electrode active material. The negative electrode of the present disclosure may be used as a negative electrode of the lithium ion secondary battery of the present disclosure.

The negative electrode material of the present disclosure is used as a negative-electrode active material included in the negative-electrode composition layer of the lithium ion secondary battery.

From the viewpoint of increasing the capacity of a battery, the content of the negative electrode material of the present disclosure is preferably 80% by mass or more, more preferably 85% by mass or more, further preferably 90% by mass or more, with respect to the total amount of the negative-electrode composition layer.

In the following, details of the negative-electrode composition layer and the current collector are explained.

The negative-electrode composition layer includes a negative-electrode active material and a binder or the like, and is disposed on a current collector. The method for forming the negative-electrode composition layer is not particularly limited. For example, the negative-electrode composition layer may be formed by preparing a slurry of a negative-electrode composition by dissolving or dispersing a negative-electrode active material, a binder, and optional components such as a conductive agent or a thickening agent, with a solvent, and applying the slurry to a current collector and drying (wet method).

Examples of the conductive agent include graphite other than the graphite particles according to the negative electrode material of the present disclosure, such as natural graphite and artificial graphite, carbon black such as acetylene black, and amorphous carbon such as needle coke. A single kind of the conductive agent may be used, or two or more kinds thereof may be used in combination.

The content of the conductive agent with respect to the mass of the negative-electrode composition layer is preferably from 1% by mass to 45% by mass, more preferably from 2% by mass to 42% by mass, further preferably from 3% by mass to 40% by mass, from the viewpoint of improving the conductivity and reducing the initial irreversible capacity of a battery.

When the content of the conductive agent is 1% by mass or more, a sufficient degree of conductivity tends to be achieved. When the content of the conductive agent is 45% by mass or less, a decrease in battery capacity tends to be suppressed.

The binder for the negative electrode is not particularly limited, and may be selected from materials being stable with respect to a non-aqueous electrolyte or a solvent used for forming an electrode.

Specific examples of the binder include resin-type polymers such as polyethylene, polypropylene, polyethylene terephthalate, cellulose and nitrocellulose; rubber-type polymers such as SBR (styrene-butadiene rubber) and NBR (acrylonitrile-butadiene rubber); fluorine-type polymers such as polyvinylidene fluoride (PVdF), polytetrafluoroethylene and fluorinated polyvinylidene fluoride; and polymer compositions being conductive to alkali metal ions (especially lithium ions). A single kind of the binder for negative electrode may be used, or two or more kinds thereof may be used in combination.

From the viewpoint of stability of a positive electrode, the binder is preferably SBR or fluorine-type polymers such as polyvinylidene fluoride.

The content of the binder with respect to the mass of the negative-electrode composition layer is preferably from 0.1% by mass to 20% by mass, more preferably from 0.5% by mass to 15% by mass, further preferably from 0.6% by mass to 10% by mass.

When the content of the binder is 0.1% by mass or more, it is possible to sufficiently bind the negative-electrode active material, thereby imparting a sufficient degree of mechanical strength to the negative-electrode composition layer. When the content of the binder is 20% by mass or less, the negative electrode tends to achieve a sufficient degree of capacity and a sufficient degree of conductivity.

When a fluorine-type polymer such as polyvinylidene fluoride is used as a major component of the binder, the content of the binder with respect to the mass of the negative-electrode composition layer is preferably from 1% by mass to 15% by mass, more preferably from 2% by mass to 10% by mass, further preferably from 3% by mass to 8% by mass.

The thickening agent is used for adjusting the viscosity of a slurry. The thickening agent is not specifically limited, and examples thereof include carboxymethyl cellulose, methyl cellulose, hydroxymethyl cellulose, ethyl cellulose, polyvinyl alcohol, oxidized starch, phosphorylated starch, casein and a salt of these materials. A single kind of the thickening agent may be used, or two more kinds may be used in combination.

The content of the thickening agent with respect to the mass of negative-electrode composition layer is preferably from 0.1% by mass to 5% by mass, more preferably from 0.5% by mass to 3% by mass, further preferably from 0.6% by mass to 2% by mass, from the viewpoint of the input/output properties and capacity of a battery.

The solvent used for preparing a slurry is not particularly limited, as long as it can dissolve or disperse a negative-electrode active material, a binder, and optional components such as a conductive agent or a thickening agent. The solvent may be either an aqueous solvent or an organic solvent. Examples of the aqueous solvent include water, alcohol and a mixed solvent of water and alcohol. Examples of the organic solvent include N-methyl-2-pyrrolidone (NMP), dimethyl formamide, dimethyl acetamide, methyl ethyl ketone, cyclohexanone, methyl acetate, methyl acrylate, tetrahydrofuran (THF), toluene, acetone, diethyl ether, dimethyl sulfoxide, benzene, xylene and hexane.

The thickening agent is preferably used especially in a case of using an aqueous solvent.

The density of the negative-electrode composition layer is preferably from 0.7 $g/cm^3$ to 2 $g/cm^3$, more preferably from 0.8 $g/cm^3$ to 1.9 $g/cm^3$, further preferably from 0.9 $g/cm^3$ to 1.8 $g/cm^3$.

When the density of the negative-electrode composition layer is 0.7 $g/cm^3$ or more, it is possible to improve the conductivity in the negative-electrode active material and suppress an increase in battery resistance, thereby improving the capacity per volume. When the density of the negative-electrode composition layer is 2 $g/cm^3$ or less, it is possible to reduce a risk of degradation of discharge properties, which is caused by an increase in initial irreversible capacity and a decrease in permeability of a non-aqueous electrolyte at an interface of a current collector and a negative-electrode active material.

The amount of the negative-electrode composition to apply to a current collector as a solid content is preferably from 30 $g/m^2$ to 150 $g/m^2$, more preferably from 40 $g/m^2$ to 140 $g/m^2$, further preferably from 45 $g/m^2$ to 130 $g/m^2$, for one side of the current collector.

In view of the amount of the negative-electrode composition to apply to a current collector and the density of the negative-electrode composition layer, the average thickness of the negative-electrode composition layer is preferably from 10 μm to 150 μm, more preferably from 15 μm to 140 μm, further preferably from 15 μm to 120 μm.

The material for the current collector for the negative electrode is not particularly limited, and examples thereof include metal materials such as copper, nickel, stainless steel and nickel-plated steel. From the viewpoint of ease of processing and production costs, copper is preferred.

The shape of the current collector is not particularly limited, and a material in any shape may be used. Examples of the current collector include metal foils, metal plates, metal films and expanded metal meshes. Among these, metal films are preferred and copper foils are more preferred. The copper foils include rolled copper foils obtained by a roll method and electrolytic copper foils obtained by an electrolytic method, and either one of these may be suitably used as a current collector.

The average thickness of the current collector is not particularly limited. For example, the average thickness is preferably from 5 μm to 50 μm, more preferably from 8 μm to 40 μm, further preferably from 9 μm to 30 μm.

When the average thickness of the current collector is less than 25 μm, it is possible to improve the strength of the current collector by using a copper alloy such as phosphor bronze, titanium copper, Corson alloy and Cu—Cr—Zr alloy, rather than pure copper.

(Non-Aqueous Electrolyte)

The non-aqueous electrolyte generally includes a non-aqueous solvent and a lithium salt (electrolyte).

Examples of the non-aqueous solvent include cyclic carbonates, linear carbonates and cyclic sulfonic esters.

The cyclic carbonate preferably has an alkylene group constituting the cyclic carbonate with a carbon number of from 2 to 6, more preferably from 2 to 4, and examples thereof include ethylene carbonate, propylene carbonate and butylene carbonate. Among these, ethylene carbonate and propylene carbonate are preferred.

The linear carbonate is preferably a dialkyl carbonate, having two alkyl groups with a carbon number of preferably from 1 to 5, more preferably from 1 to 4, respectively, and examples thereof include symmetric dimethyl carbonates such as diethyl carbonate and di-n-propyl carbonate; and asymmetric linear carbonates such as ethyl methyl carbonate, methyl-n-propyl carbonate and ethyl-n-propyl carbonate. Among these, dimethyl carbonate and ethyl methyl carbonate are preferred.

The use of dimethyl carbonate tends to improve cycle characteristics more than diethyl carbonate, since dimethyl carbonate is more resistant to oxidation and reduction than diethyl carbonate.

The use of ethyl methyl carbonate tends to improve the low-temperature characteristics of a battery due to an asymmetry molecular structure and a low melting point thereof.

It is especially preferred to use a mixed solvent of ethylene carbonate, dimethyl carbonate and ethyl methyl carbonate in view of securing the battery properties over a wide temperature range.

The content of a cyclic carbonate and a linear carbonate is preferably 85% by mass or more, more preferably 90% by mass or more, further preferably 95% by mass or more, with respect to the total amount of the non-aqueous solvent.

When a cyclic carbonate and a linear carbonate are used in combination, the mixed ratio thereof (cyclic carbonate/linear carbonate, by volume) is preferably from 1/9 to 6/4, more preferably from 2/8 to 5/5.

Examples of the cyclic sulfonic ester include 1,3-propane sultone, 1-methyl-1,3-propane sultone, 3-methyl-1,3-propane sultone, 1,4-butane sultone, 1,3-propene sultone and 1,4-butene sultone. Among these, 1,3-propane sultone and 1,4-butane sultone are preferred in view of reducing the direct-current resistance.

The non-aqueous electrolyte may further include a linear ester, a cyclic ester, a linear ether, a cyclic sulfone, or the like.

Example of the linear ester include methyl acetate, ethyl acetate, propyl acetate and methyl propionate. Among these, methyl acetate is preferred from the viewpoint of improving the low-temperature characteristics.

Examples of the cyclic ether include tetrahydrofuran, 2-methyl tetrahydrofuran, and tetrahydropyran.

Examples of the linear ether include dimethoxyethane and dimethoxymethane.

Examples of the cyclic sulfone include sulfolane and 3-methylsulfolane.

The non-aqueous electrolyte may include a silyl phosphate.

Examples of the silyl phosphate include tris(trimethylsilyl) phosphate, dimethyl(trimethylsilyl) phosphate, methyl bis(trimethylsilyl) phosphate, diethyl(trimethylsilyl) phosphate, ethyl bis(trimethylsilyl) phosphate, dipropyl(trimethylsilyl) phosphate, propyl bis(trimethylsilyl) phosphate, dibutyl(trimethylsilyl) phosphate), butyl bis(trimethylsilyl) phosphate, dioctyl (trimethylsilyl) phosphate, octyl bis(trimethylsilyl) phosphate, diphenyl(trimethylsilyl) phosphate, phenyl bis(trimethylsilyl) phosphate, di(trifluoroethyl)(trimethylsilyl) phosphate, trifluoroethyl bis(trimethylsilyl) phosphate, compounds in which a trimethylsilyl group of these (trimethylsilyl) phosphates is substituted with a triethylsilyl group, a triphenylsilyl group, a t-butyldimethylsilyl group or the like, and compounds having a condensed phophate structure in which phosphorus atoms are bonded via an oxygen atom by condensation of phosphates.

Among these, tris(trimethylsilyl) phosphate (TMSP) is preferably used. It is possible to suppress an increase in resistance by tris(trimethylsilyl) phosphate with a smaller amount of addition, as compared with other (trimethylsilyl) phosphates.

A single kind of the tris(trimethylsilyl) phosphate may be used, or two or more kinds thereof may be used in combination.

When the non-aqueous electrolyte includes a tris(trimethylsilyl) phosphate, the content thereof is preferably from 0.1% by mass to 5% by mass, more preferably from 0.3% by mass to 3% by mass, further preferably from 0.4% by mass to 2% by mass, with respect to the total amount of non-aqueous electrolyte.

In particular, when the non-aqueous electrolyte includes TMSP, the content thereof is preferably from 0.1% by mass to 0.5% by mass, more preferably from 0.1% by mass to 0.4% by mass, further preferably from 0.2% by mass to 0.4% by mass, with respect to the total amount of non-aqueous electrolyte. When the content of TMSP is within the above range, lifetime properties tend to improve by the action of a thin SEI (solid electrolyte interphase) or the like.

The non-aqueous electrolyte may include vinylene carbonate (VC). By using VC, a stable coating film is formed on a surface of the negative electrode during the charging of a lithium ion secondary battery. The coating film has an effect of suppressing decomposition of a non-aqueous electrolyte at a surface of the negative electrode.

The content of vinylene carbonate is preferably from 0.3% by mass to 1.6% by mass, more preferably from 0.3% by mass to 1.5% by mass, further preferably from 0.3% by mass to 1.3% by mass, with respect to the total amount of a non-aqueous electrolyte. When the content of vinylene carbonate is within the above range, lifetime properties tend to improve and a decrease in charge/discharge efficiency, which is caused by decomposition of excessive VC during the charging of a lithium ion secondary battery, tends to be suppressed.

In the following, the lithium salt (electrolyte) is explained.

The lithium salt is not particularly limited as long as it is usable as an electrolyte for a non-aqueous electrolyte for a lithium ion secondary battery, and examples thereof include inorganic lithium salts, fluorine-containing organic lithium salts, and oxalato borates.

Examples of the organic lithium salt include inorganic fluoride salts such as $LiPF_6$, $LiBF_4$, $LiAsF_6$ and $LiSbF_6$, perhalogen acid salts such as $LiClO_4$, $LiBrO_4$ and $LiIO_4$, and inorganic chloride salts such as $LiAlCl_4$.

Examples of the fluorine-containing organic lithium salt include perfluoroalkane sulfonate such as $LiCF_3SO_3$; perfluoroalkane sulfonylimide salts such as $LiN(CF_3SO_2)_2$, $LiN(CF_3CF_2SO_2)_2$ and $LiN(CF_3SO_2)(C_4F_9SO_2)$; perfluoroalkane sulfonylmethide salts such as $LiC(CF_3SO_2)_3$; and fluoroalkyl fluorinated phosphates such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$ and $Li[PF_3(CF_2CF_2CF_2CF_3)_3]$.

Examples of the oxalato borate include lithium bis(oxalato) borate and lithium difluoro(oxalato) borate.

A single kind of lithium salt may be used, or two or more kinds of lithium salt may be used in combination.

From the viewpoint of dissolvability to a solvent, charge/discharge properties or cycle properties of a lithium ion secondary battery, and the like, lithium hexafluorophosphate ($LiPF_6$) is preferred.

The concentration of the electrolyte in the non-aqueous electrolyte is not particularly limited. The concentration of the electrolyte is preferably 0.5 mol/L or more, more preferably 0.6 mol/L or more, further preferably 0.7 mol/L or more. The concentration of the electrolyte is preferably 2 mol/L or less, more preferably 1.8 mol/L or less, further preferably 1.7 mol/L or less.

When the concentration of the electrolyte is 0.5 mol/L or more, the non-aqueous electrolyte tends to have a sufficient degree of electrical conductivity. When the concentration of the electrolyte is 2 mol/L or less, an increase in viscosity of the non-aqueous electrolyte tends to be suppressed, thereby increasing the electrical conductivity. By increasing the electrical conductivity of the non-aqueous electrolyte, performances of a lithium ion secondary battery tend to improve.

(Separator)

The separator is not particularly limited, as long as it exhibits ion permeability while electrically insulating a positive electrode from a negative electrode, and is resistant to the oxidation at a positive-electrode side and the reduction at a negative-electrode side. Materials for a separator that satisfies these properties include resins and inorganic substances.

Examples of the resin include olefin-type polymers, fluorine-type polymers, cellulose-type polymers, polyimide and nylon. It is preferred to select a polymer that is stable with respect to a non-aqueous electrolyte and has a favorable ability to retain moisture, such as a porous sheet or a nonwoven cloth made of polyolefin such as polyethylene or polypropylene.

Examples of the inorganic substance include oxides such as alumina and silica, nitrides such as aluminum nitride and silicon nitride, and glass. For example, it is possible to use a separator having a configuration in which an inorganic substance is applied onto a film-like substrate in the form of a cloth, a microporous film or the like. Suitable film-like substrates may have a pore size of from 0.01 μm to 1 μm and an average thickness of from 5 μm to 50 μm. It is also possible to use a composite porous layer prepared by bonding an inorganic substance in the form of fibers or particles with a binder such as a resin. The composite porous layer may be formed on a surface of a different separator to form a multilayer separator. Further, the multilayer separator may be formed on a separator of a positive electrode or a negative electrode.

(Other Components)

The lithium ion secondary battery may have a cleavable vent. By opening the cleavable vent, it is possible to suppress a pressure increase caused inside the battery and improve its safety.

The lithium ion secondary battery may have a component for discharging an inert gas such as carbon dioxide when the temperature inside the battery increases. By providing the component for discharging an inert gas, it is possible to open a vent immediately by an inert gas being generated as the temperature inside the battery increases, thereby improving the safety of the battery. The component is preferably formed from a material such as lithium carbonate, polyethylene carbonate or polypropylene carbonate.

In the present disclosure, the negative-electrode capacity of the lithium ion secondary battery refers to a discharge capacity of a negative electrode, and the positive-electrode capacity of the lithium ion secondary battery refers to a value obtained by subtracting an irreversible capacity at positive electrode or negative electrode, whichever is greater, from an initial charge capacity at positive electrode.

The discharge capacity at a negative electrode is defined as a value calculated with a charge/discharge device when lithium ions are released from a negative-electrode active material.

The initial charge capacity at a positive electrode is defined as a value calculated with a charge/discharge device when lithium ions are released from a positive-electrode active material.

The capacity ratio of a negative electrode and a positive electrode may be calculated as "discharge capacity at negative electrode/discharge capacity of lithium ion secondary battery".

The discharge capacity of a lithium ion secondary battery can be measured after charging at constant current and constant voltage (CCCV) at 4.2V, 0.1 C to 0.5 C and end time of 2 to 5 hours, and subsequently discharging at constant current (CC) to 2.7V at 0.1 C to 0.5 C. for example.

The discharge capacity of the negative electrode can be calculated by converting a discharge capacity per area of the negative electrode into a value corresponding to a total area of the negative electrode to be used in a lithium ion secondary battery.

The discharge capacity per area of the negative electrode can be measured using a monopolar cell, after charging at constant current and constant voltage (CCCV) at 0V, 0.1 C and an end current of 0.01 C and subsequently discharging at constant current (CC) to 1.5V at 0.1 C. The monopolar cell is formed from a negative electrode obtained by cutting a negative electrode used for the measurement of the discharge capacity of a lithium ion secondary battery into a specific size, metallic lithium as a counter electrode, and a separator being soaked in a non-aqueous electrolyte.

In the monopolar cell, a direction in which lithium ions are intercalated into a negative-electrode active material is defined as a direction of charging, and a direction in which lithium ions are released from a negative-electrode active material is defined as a direction of discharging. The unit "C" refers to "current (A)/discharge capacity of battery (Ah)".

(Lithium Ion Secondary Battery)

Figure 1:
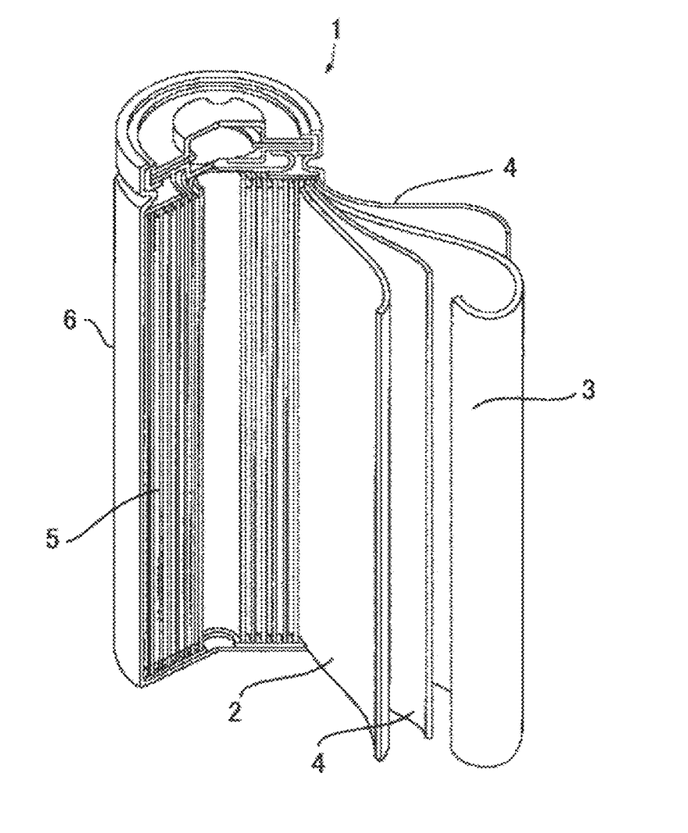
FIG. 1 is a schematic sectional view illustrating an exemplary configuration of a lithium ion secondary battery.

In the following, an embodiment of the lithium ion secondary battery with a 18650-type cylindrical shape by referring to a drawing. FIG. 1 is a sectional view of a lithium ion secondary battery according to the present disclosure.

As shown in FIG. 1, the lithium ion secondary battery 1 has a cylindrical battery container 6 made of nickel-plated steel. An electrode roll 5, obtained by rolling a ribbon-shaped positive electrode 2 and a ribbon-shaped negative electrode 3 with a separator 4 therebetween, is stored in the battery container 6. The separator 4 may have a size of 58 mm in width and 30 μm in average thickness, for example. On the top of the electrode roll 5, a ribbon-shaped positive-electrode tab terminal, which is made of aluminum and has an end being fixed to the positive electrode 2, is lead out. The other end of the positive-electrode tab terminal is joined to a bottom side of a battery lid having a disk shape, which is disposed on the top of the electrode roll 5 and functions as a positive-electrode external terminal, by ultrasonic welding.

At the bottom side of the electrode roll 5, a ribbon-shaped negative-electrode tab terminal, which is made of copper and has an end being fixed to the negative electrode 3, is lead out. The other end of the negative-electrode tap terminal is joined to an internal bottom of the battery container 6 by resistance welding. Accordingly, the positive-electrode tab terminal and the negative-electrode tab terminal are lead out at each of the end faces of the electrode roll 5, respectively. The outer periphery of the electrode roll 5 is covered with an insulating coating (not shown). The battery lid is fixed at the top of the battery container 6 via an insulating gasket made of resin. Therefore, the lithium ion battery secondary 1 is hermetically sealed. The internal space of the lithium ion secondary battery 1 is filled with a non-aqueous electrolyte (not shown).

EXAMPLES

In the following, the present embodiments are explained in view of the Examples. However, the present invention is not limited to these Examples.

Preparation of Negative Electrode Material

Comparative Example 1

A mixture was prepared by mixing 100 parts by mass of spherical natural graphite particles with a volume average particle size of 10.0 μm and 10 parts by mass of coal tar pitch (softening point: 90° C., carbonization ratio: 50%). Subsequently, a low-crystalline carbon layer was formed at a surface of the graphite particles by subjecting the mixture to a thermal treatment. The thermal treatment was performed by elevating the temperature from 25° C. to 1,000° ° C. at a rate of 200° C./hour and maintaining the temperature at 1,000° ° C. for 1 hour under nitrogen flow. The resultant was pulverized with a cutter mill and sieved, thereby obtaining a negative electrode material. The physical properties of the negative electrode material are shown in Table 1.

Example 1

A mixture was prepared by mixing 100 parts by mass of spherical natural graphite particles with a volume average particle size of 10.0 μm, 7 parts by mass of coal tar pitch (softening point: 90° C., carbonization ratio: 50%) and 11 parts by mass of polyvinyl alcohol (carbonization ratio: 14%). A negative electrode material was prepared from the mixture in the same manner as Comparative Example 1. The physical properties of the negative electrode material are shown in Table 1.

Comparative Example 2

A mixture was prepared by mixing 100 parts by mass of spherical natural graphite particles with a volume average particle size of 8.0 μm and 10 parts by mass of coal tar pitch (softening point: 90° C., carbonization ratio: 50%). A negative electrode material was prepared from the mixture in the same manner as Comparative Example 1. The physical properties of the negative electrode material are shown in Table 1.

Example 2

A mixture was prepared by mixing 100 parts by mass of spherical natural graphite particles with a volume average particle size of 8.0 μm, 7 parts by mass of coal tar pitch (softening point: 90° C., carbonization ratio: 50%) and 11 parts by mass of polyvinyl alcohol (carbonization ratio: 14%). A negative electrode material was prepared from the mixture in the same manner as Comparative Example 1. The physical properties of the negative electrode material are shown in Table 1.

[Preparation of Negative Electrode]

A mixture was prepared by adding carboxymethyl cellulose (CMC) as a thickening agent and styrene/butadiene rubber (SBR) as a binder to the negative electrode material at a mass ratio of 98:1:1 (negative electrode material:CMC:SBR). A slurry was prepared by adding pure water as a dispersing solvent to the mixture. The slurry was applied to each side of a rolled copper foil with an average thickness of 10 μm as a current collector, in a substantially uniform manner. The density of the negative-electrode composition layer was adjusted to 1.3 g/cm$^3$.

[Preparation of Positive Electrode]

A lamellar lithium/nickel/manganese/cobalt composite oxide (NMC, BET specific surface area: 0.4 m$^2$/g, average particle size (d50): 6.5 μm) was used as a positive-electrode active material.

A mixture was prepared by adding acetylene black (average particle size: 48 nm (catalogue value), HS-100, Denka Company, Limited.) as a conductive agent, and subsequently polyvinylidene fluoride as a binder, to the positive-electrode active material at a mass ratio (positive-electrode active material:conductive agent:binder) of 90:5:5. A slurry was prepared by adding N-methyl-2-pyrrolidone (NMP) to the mixture. The slurry was applied to each side of a n aluminum foil with an average thickness of 20 μm as a current collector in a substantially uniform manner, and dried. The density of the positive-electrode composition layer was adjusted to 2.7 g/cm$^3$. The amount of the slurry applied to each side of the current collector was 40 g/m$^2$ in a solid content.

[Preparation of Lithium Ion Secondary Battery]

A rolled electrode body was prepared from the positive electrode and the negative electrode, with a polyethylene single-layer separator with an average thickness of 30 μm (HIPORE, Asahi Kasei Corporation) being inserted therebetween. The lengths of the positive electrode, negative electrode and separator were adjusted such that the diameter of the electrode body was 17.15 mm. A collecting lead was attached to the electrode body, and the electrode body was inserted in a 18650-type battery case. The battery case was filled with a non-aqueous electrolyte, and was sealed to obtain lithium ion secondary battery.

As a non-aqueous electrolyte, a mixed solvent of ethylene carbonate (EC), dimethyl carbonate (DMC) and ethyl methyl carbonate (EMC) at a volume ratio (EC:DMC:EMC) of 2:3:2, containing 1.2 mol/L of lithium hexafluorophosphate (LiPF$_6$) and 1.0% by mass of vinylene carbonate (VC).

The lithium ion secondary battery was charged at a constant current of 0.5 CA to 4.2V at 25° C., and then charged at a constant volume of 4.2V until the current value was 0.01 CA. Subsequently, the battery was discharged to 2.7V at a constant current of 0.5 CA. These steps were conducted 3 cycles in total, with an interval of 30 minutes between each of the charging and discharging, thereby bring the lithium ion secondary battery to an initial state.

[Evaluation of Input Characteristics]

(1) The lithium ion secondary battery in an initial state was charged to 4.2V at a constant current of 0.2 CA, and charged at a constant voltage of 4.2V until the current value was 0.01 CA. The charging capacity at this time was regarded as "Charging Capacity 1" (mAh).

(2) After an interval of 30 minutes, the battery was discharged to 2.7V at a constant current of 0.2 CA.

(3) After an interval of 30 minutes, the battery was charged to 4.2V at a constant current of 5 CA. The charging capacity at this time was regarded as "Charging Capacity 2" (mAh).

Input characteristics (%)=Charging Capacity 2 (mAh)/Charging Capacity 1 (mAh)×100

[Evaluation of Storage Characteristics]

(1) The lithium ion secondary battery in an initial state was charged to 4.2V at a constant current of 0.5 CA, and charged at a constant voltage of 4.2V until the current value was 0.01 CA.

(2) After an interval of 30 minutes, the battery was discharged to 2.7V at a constant current of 0.5 CA. The discharged capacity at this time was regarded as "Discharged Capacity 1" (mAh).

(3) After an interval of 30 minutes, the battery was charged to 4.2V at a constant current of 5 CA.

(4) The battery was left at 60° ° C. for 30 days.

(5) The battery was discharged to 2.7V at a constant current of 0.5 CA. The discharged capacity at this time was regarded as "Discharged Capacity 2" (mAh).

(6) The storage characteristics of the battery was calculated by the following formula.

Storage characteristics (%)=Discharged Capacity 2 (mAh)/Discharged Capacity 1 (mAh)×100

TABLE 1

| | Example 2 | Example 1 | Comparative Example 2 | Comparative Example 1 |
|---|---|---|---|---|
| Average partice size | 8.0 | 10.0 | 8.0 | 10.0 |
| Average degree of circularity | 0.91 | 0.95 | 0.91 | 0.95 |
| Precursor for low-crystalline carbon layer | Pitch/PVA | Pitch/PVA | Pitch | Pitch |
| Number of peaks in R-value histogram | 2 | 2 | 1 | 1 |
| Variance of maximum peak in R-value histogram | 3.1 | 2.9 | 1.6 | 1.5 |
| Input characteristics (%) | 95 | 90 | 91 | 80 |
| Storage characteristics (%) | 95 | 95 | 83 | 90 |

As shown in Table 1, Examples 1 and Example 2, in which the negative electrode material satisfies each of Condition A, Condition B or Condition C, exhibited favorable results in storage characteristics as compared with Comparative Examples 1 and Comparative Example 2, in which the negative electrode material does not satisfy any of Condition A, Condition B or Condition C.

Example 2, in which the average particle size of negative electrode was 8.0 μm, exhibited favorable results in input characteristics as compared with Example 1, in which the average particle size of negative electrode was 10.0 µm.

All publications, patent applications, and technical standards mentioned in the present specification are incorporated herein by reference to the same extent as if each individual publication, patent application, or technical standard was specifically and individually indicated to be incorporated by reference.

The invention claimed is:

1. A negative electrode material for a lithium ion secondary battery, the negative electrode material comprising graphite particles and a low-crystalline carbon layer that covers at least a portion of a surface of the graphite particles, and satisfying at least one of the following conditions (1) and (2);
   (1) the negative electrode material has a variance of 2.0 or more of a maximum peak in an R-value histogram obtained by a mapping Raman measurement, and
   (2) the low-crystalline carbon layer has two or more carbon phases with a different degree of crystallinity from each other.

2. The negative electrode material for a lithium ion secondary battery according to claim 1, wherein the negative electrode material has a variance of 2.0 or more of a maximum peak in an R-value histogram obtained by a mapping Raman measurement.

3. The negative electrode material for a lithium ion secondary battery according to claim 1, wherein the low-crystalline carbon layer has two or more carbon phases with a different degree of crystallinity from each other.

4. The negative electrode material for a lithium ion secondary battery according to claim 1, having an average degree of circularity of from 0.8 to 1.0.

5. A negative electrode for a lithium ion secondary battery, the negative electrode comprising:
   a current collector, and
   a negative electrode composition layer comprising the negative electrode material for a lithium ion secondary battery according to claim 1, which is disposed at a surface of the current collector.

6. A lithium ion secondary battery, comprising the negative electrode for a lithium ion secondary battery according to claim 5.

7. The negative electrode material for a lithium ion secondary battery according to claim 2, having an average degree of circularity of from 0.8 to 1.0.

8. A negative electrode for a lithium ion secondary battery, the negative electrode comprising:
   a current collector, and
   a negative electrode composition layer comprising the negative electrode material for a lithium ion secondary battery according to claim 2, which is disposed at a surface of the current collector.

9. A lithium ion secondary battery, comprising the negative electrode for a lithium ion secondary battery according to claim 8.

10. The negative electrode material for a lithium ion secondary battery according to claim 3, having an average degree of circularity of from 0.8 to 1.0.

11. A negative electrode for a lithium ion secondary battery, the negative electrode comprising:
    a current collector, and
    a negative electrode composition layer comprising the negative electrode material for a lithium ion secondary battery according to claim 3, which is disposed at a surface of the current collector.

12. A lithium ion secondary battery, comprising the negative electrode for a lithium ion secondary battery according to claim 11.

13. The negative electrode material for a lithium ion secondary battery according to claim 1, wherein the low-crystalline carbon layer comprises a carbon material having an interlayer distance in carbon network planes (d002) measured by wide angle X-ray diffraction of 0.340 nm or more.

14. The negative electrode material for a lithium ion secondary battery according to claim 1, wherein the low-crystalline carbon layer has a thickness of from 0.5 nm to 500 nm.

15. A method for producing the negative electrode material for a lithium ion secondary battery according to claim 1, the method comprising:
    subjecting a mixture containing graphite particles and two or more kinds of precursors for the low-crystalline carbon layer to a thermal treatment, thereby covering at least a portion of a surface of the graphite particles with the low-crystalline carbon layer.

16. The method according to claim 15, wherein the precursors comprise pitch and an organic polymer compound.

17. A method for producing the negative electrode material for a lithium ion secondary battery according to claim 1, the method comprising:
    subjecting a mixture containing graphite particles and a precursor for the low crystalline carbon layer to a thermal treatment,
    adding a different kind of precursor for the low crystalline carbon layer to the mixture, and
    subjecting the mixture to a further thermal treatment, thereby covering at least a portion of a surface of the graphite particles with the low-crystalline carbon layer.

18. The method according to claim 17, wherein the precursors comprise pitch and an organic polymer compound.

* * * * *